United States Patent [19]

Jimerson

[11] Patent Number: 5,476,185
[45] Date of Patent: Dec. 19, 1995

[54] REMOVABLE ANTI-SIPHON FILLNECK SCREENS FOR FUEL TANKS

[75] Inventor: Robert C. Jimerson, Versailles, N.Y.

[73] Assignee: Snyder Tank Corporation, Buffalo, N.Y.

[21] Appl. No.: 344,555

[22] Filed: Nov. 23, 1994

[51] Int. Cl.⁶ .................................................. B65D 51/18
[52] U.S. Cl. ............................................................ 220/86.3
[58] Field of Search .............................................. 220/86.3

[56] References Cited

U.S. PATENT DOCUMENTS

| | | | |
|---|---|---|---|
| 1,995,007 | 3/1935 | Myers | 220/86.3 |
| 2,371,241 | 3/1945 | Jaffa | 220/86.3 |
| 3,892,330 | 7/1975 | Hotchkiss et al. | 220/86.3 |
| 3,991,792 | 11/1976 | Kettler | 220/86.3 |
| 5,025,946 | 6/1991 | Butkovich et al. | 220/86.3 |

*Primary Examiner*—Joseph M. Moy
*Attorney, Agent, or Firm*—Phillips, Lytle, Hitchcock, Blaine & Huber

[57] ABSTRACT

This invention provides an improved anti-siphon fillneck screen for a vehicle-mounted fuel tanks. The improved device (10) includes an anti-theft member (14) adapted to be removably mounted within a fillneck (13). The anti-theft member has a screen portion (26) and a flange portion (28) extending radially outwardly therefrom. The flange portion is captured between two retaining rings (15,16) inserted into the fillneck. Thus, the improved screen may be removed by means of a special tool.

7 Claims, 1 Drawing Sheet

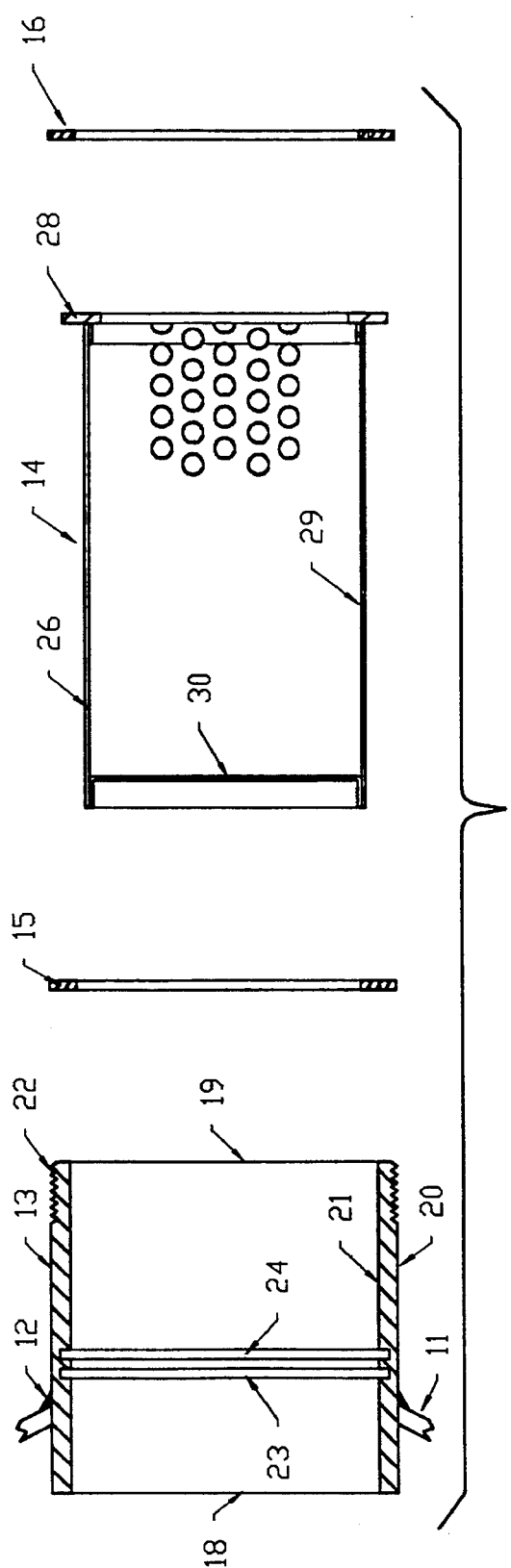
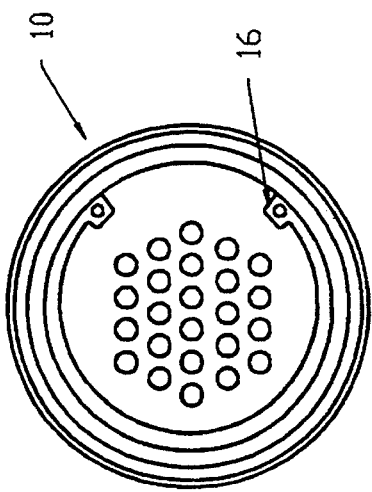
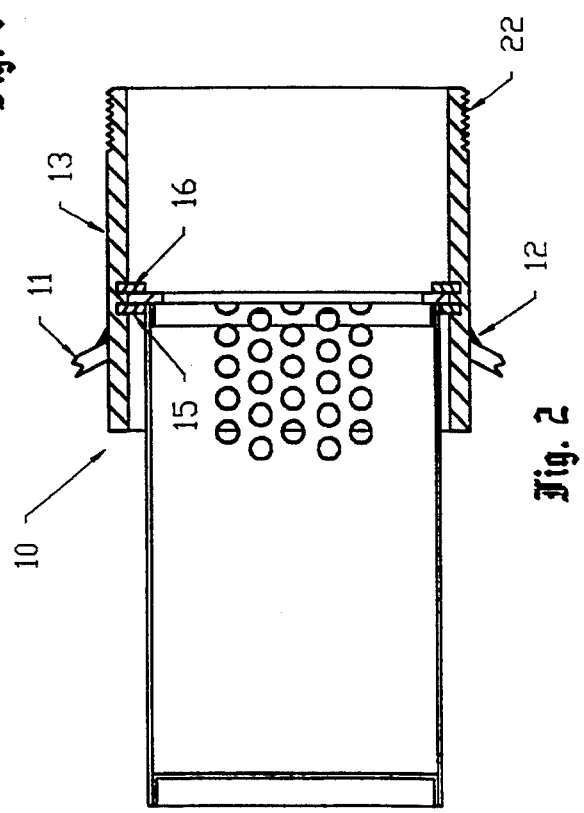

REMOVABLE ANTI-SIPHON FILLNECK SCREENS FOR FUEL TANKS

TECHNICAL FIELD

The present invention relates generally to the field of liquid storage tanks (e.g., vehicle fuel tanks), and, more particularly, to improved anti-siphon fillneck screens for such tanks.

BACKGROUND ART

Because of rising fuel costs, there is a persistent problem of preventing a thief from siphoning fuel from a parked vehicle. Large over-the-road trucks may carry hundreds of gallons of diesel fuel. If parked in an accessible location, a would-be thief need only insert a siphon tube into the fuel tank and create a vacuum to establish a flow from the tank to some other storage container. Thus, a length of flexible tubing and a container are virtually all the thief needs.

Because of the ease by which such fuel may be siphoned, it has been known to permanently mount an anti-siphon screen in the fillneck of such a fuel tank. Traditionally, the fillneck is simply welded to the fuel tank, and a portion of the fillneck extends within the tank's interior. The conventional anti-siphon screen surrounds a portion of the inner end of the fillneck (i.e., the end within the tank), and is suitably welded thereto. While effective, this required that the fillneck screen have been applied when the tank was originally manufactured. Existing tanks could not be retrofitted with an after-market fillneck screen. Moreover, should the fillneck screen become damaged for any reason, it could not be readily repaired.

Accordingly, there is believed to be a clear and present need for an improved anti-siphon fillneck screen which can be quickly and removably mounted on a liquid storage tank.

DISCLOSURE OF THE INVENTION

With parenthetical reference to the corresponding parts, portions or surfaces of the disclosed embodiment, merely for purposes of illustration and not by way of limitation, the present invention broadly provides an improved removable anti-siphon fillneck screen for fuel tanks.

In one aspect, the improved device (10) broadly comprises: an elongated tubular fillneck (13) having an inner end (18) adapted to be placed within, or secured to, a fuel tank (11), having an outer end (19), and having an inwardly-facing surface (21) extending between the two ends. A pair of longitudinally-spaced parallel annular grooves (23,24) extend into the fillneck from its inner surface at locations between its inner and outer ends.

An anti-theft member (14) having a screen portion (26) and a flange portion (28) extending outwardly therefrom is removably mounted within the fillneck. In the preferred embodiment, the screen portion is cup-shaped, and is formed of a perforated sheet metal. The flange portion has opposite longitudinally-facing surfaces. The flange portion (28) is so dimensioned, configured and arranged as to fit within the fillneck between the annular grooves. The flange portion is captured between retaining rings (15,16) that received in the grooves. Accordingly, these retaining rings function to removably hold the member within the fillneck. Therefore, the screen portion is operatively held within the fillneck to permit liquid to freely pass through the fillneck, but to prevent insertion of some physical objects, such as a siphon tube.

In another aspect, the invention provides an anti-theft device (10) for a tank, which broadly comprises: an elongated tubular fillneck (13) adapted to be mounted on a tank (11), having inner and outer ends (18,19), having an inwardly-facing surface, having an internal shoulder surface (e.g., the rightwardly-facing annular vertical surface of left retaining ring 15) facing toward the outer end, and having an annular groove (24) extending into said fillneck from the inner surface at a location spaced from the shoulder surface; a member (14) having a screen portion (26) and having a flange portion (28) extending outwardly from the screen portion, the flange portion having opposite longitudinally-facing surfaces, the flange portion being so dimensioned and configured as to fit between the shoulder surface and the groove; and a retaining ring (16) in the groove to removably hold the member in the fillneck; whereby the screen portion will be operatively held within the fillneck to permit liquid to freely pass through the fillneck but to prevent insertion of some physical objects.

Accordingly, the general object of the invention is to provide improved antisiphon fillneck screens for liquid-containing storage tanks.

Another object is to provide improved anti-siphon fillneck screens for vehicle-mounted fuel tanks.

Still another object is to provide an improved fillneck screen, which may be removably mounted on a fillneck, so as to permit the screen to be readily repaired or replaced.

These and other objects and advantages will become apparent from the foregoing and ongoing written specification, the drawings, and the appended claims.

BRIEF DESCRIPTION OF THE DRAWINGS

FIG. 1 is a fragmentary longitudinal vertical sectional view showing the improved device in exploded aligned relation to a fillneck mounted on a fuel storage tank.

FIG. 2 is a fragmentary longitudinal vertical sectional view of the assembled device in association with the fillneck.

FIG. 3 is a right end elevation of the assembled device shown in FIG. 2.

DESCRIPTION OF THE PREFERRED EMBODIMENTS

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention broadly provides an improved anti-siphon and antitheft device for a tank that is adapted to contain a liquid. The invention is particularly useful in truck-mounted fuel storage tanks. However, this particular application is merely illustrative, and should not be regarded as being limitative of the scope of the appended claims. In the accompanying drawings, a presently-preferred form of the improved device is generally indicated at 10. The tank is fragmentarily illustrated as being a portion of a vehicle-mounted truck fuel tank 11. The fillneck is welded to the tank, with the weldment being indicated at 12. The improved device broadly includes a fillneck 13, a member 14, and a pair of retaining rings 15,16.

As best shown in FIG. 1, fillneck 13 is an elongated tubular pipe-like member having a leftward or inner end 18 arranged within the tank, having a rightward or outer end 19 arranged outside the tank, having an outer cylindrical surface 20, and having an inner cylindrical surface 21. In the disclosed embodiment, fillneck 13 is in the form of a straight cylindrical tube. However, this need not invariably obtain. Fillneck 13 could, alternatively, be arcuate or curved. A marginal portion of the fillneck outer surface adjacent the outer end is threaded, as indicated at 22, to receive a suitable closure cap (not shown). A pair of annular grooves 23,24 extend radially into the fillneck from axially-spaced locations on its inner surface 21. These two grooves are generally parallel to one another. The fillneck may possibly be formed of either steel or aluminum.

The anti-theft member 14 is shown as having a horizontally-elongated thin-walled screen portion 26 and a rightward flange portion 28 extending radially outwardly therefrom. In the preferred embodiment, the screen portion is shown as being in the form of a cup-shaped member having a cylindrical side wall 29 and a leftward end wall 30. The screen member may possibly be formed of a perforated metal sheet having a large plurality of holes drilled at staggered centers, only a few of these holes being shin in the accompanying drawings. In the preferred embodiment, these holes may be about 0.25 inches in diameter, and may be staggered from one another by intervals of approximately 0.38 inches. According to this design, there are approximately 8 holes per square inch, and approximately 40% of the area of the screen portion is opened to passage of liquid therethrough. The flange portion 28 is shown as being in the form of an annular ring that is suitably mounted on the right marginal end of the screen portion and that extends radially outwardly therefrom. The axial thickness of the flange portion is less than the axial distance between the fillneck grooves 23,24. The screen need not necessarily be in the shape of a cup. Alteratively, it could be in the form of a simple cylindrical disk, or may have some other form. In some cases, the screen itself may be zinc-plated, although this is optional as well. The cup-shape is generally intended to receive insertion of the fillneck of a fuel nozzle.

The two retaining rings 15, 16 are structurally identical, and are commercially available. They are basically in the form of C-shaped members having holes in their distal ends. A suitable tool may be inserted into these holes, and the distal ends may be moved together to permit insertion and removal of the retaining ring.

The device is assembled as shown in FIG. 2. More particularly, the leftward retaining ring 15 is first inserted into the fillneck and placed in operative engagement with the left groove 23. The anti-theft member 14 is then inserted into the fillneck, as shown, with its flange 28 abutting the previously-inserted retaining ring. Thereafter, the rightward retaining ring 15 is suitably inserted into the fillneck and is operatively engaged with right groove 24. Thus, the improved basket is removably held within the fillneck, with flange portion 28 being captured between the two retaining rings. In this regard, it should be noted that the improved device may be removed by means of a suitable tool in the reverse order to that described. However, since this tool is a special-purpose tool, not likely to be carried by a would-be theft, it is felt that the improved device will be operative to defeat the vast majority of attempted fuel thefts. At the same time, this feature affords the desirable capability of being able to selectively remove the anti-theft screen member for repair or replacement. It also allows fillnecks to be formed with grooves only, with the possibility of retrofitting the tanks at the dealer level with the anti-theft screens.

Modification

The present invention contemplates that many changes and modifications may be made. Different types of retaining rings and shoulders may be used. Indeed, the inner retainer ring may, in that, be in the form of an interior shoulder provided directly within the fillneck. Other types of retaining rings and devices may be readily substituted for those shown. The anti-theft member should have a central screen portion and a flange portion extending outwardly therefrom, so as to be retained between the two abutment surfaces on the retaining rings. The screen portion may or may not be cupshaped, as desired. The invention also contemplates that other changes and modification may also be made.

If desired, the inner surface of the fillneck could have an annular shoulder, formed integrally or otherwise, to provide one of the abutment surfaces arranged in closely-spaced facing relation to the flange portion.

Therefore, while the present invention broadly provides an improved antisiphon fillneck screen for liquid storage tanks, and several modifications thereof have been discussed, persons skilled in this art will readily appreciate that various additional changes and modifications may be made without departing from the spirit of the invention, as defined and differentiated by the following claims.

What is claimed is:

1. An anti-theft device for a tank, comprising:

an elongated tubular fillneck adapted to be mounted on a fuel tank, having an inner end, having an outer end, having an inwardly-facing surface, and having a pair of longitudinally-spaced parallel annular grooves extending into said fillneck from said inwardly-facing surface at locations between said ends;

an anti-theft member having a screen portion and having a flange portion extending outwardly from said screen portion, said flange portion having opposite axially-facing surfaces, said flange portion being so dimensioned and configured as to fit within said fillneck between said grooves; and a retaining ring in each of said grooves for removably holding said member in said fillneck;

whereby said screen portion will be operatively held within said fillneck to permit liquid to freely pass through said fillneck but to prevent insertion of some physical objects.

2. An anti-theft device as set forth in claim 1 wherein said screen portion is cup-shaped.

3. An anti-theft device as set forth in claim 1 wherein said screen portion is formed of a perforated sheet material.

4. An anti-theft device as set forth in claim 1 wherein said screen portion is so dimensioned and arranged as to prevent ready insertion of a siphon tube.

5. An anti-theft device as set forth in claim 1 wherein said tank is a vehicle-mounted fuel tank.

6. An anti-theft device for a tank, comprising:

an elongated tubular fillneck adapted to be mounted on said tank, having inner and outer ends, having an inwardly-facing surface, having an internal shoulder surface facing toward said outer end, and having an annular groove extending into said fillneck from said inner surface at a location spaced from said shoulder surface;

a member having a screen portion and having a flange portion extending outwardly from said screen-portion, said flange portion having opposite longitudinally-facing surfaces, said flange-portion being so dimensioned and configured as to fit between said shoulder surface and said groove; and a first retaining ring in said groove to removably hold said member in said fillneck;

whereby said screen portion will be operatively held within said fillneck to permit liquid to freely pass through said fillneck but to prevent insertion of some physical objects.

7. An anti-theft device as set forth in claim 6 wherein a second retaining ring is mounted on said fillneck to provide said shoulder surface.

* * * * *